(12) United States Patent
Keire (10) Patent No.: US 6,311,633 B1
(45) Date of Patent: Nov. 6, 2001

(54) WOVEN FIBER-ORIENTED SAILS AND SAIL MATERIAL THEREFOR

(76) Inventor: Fred Aivars Keire, 108 Butternut Hollow Rd., Greenwich, CT (US) 06830

( * ) Notice: Subject to any disclaimer, the term of this patent is extended or adjusted under 35 U.S.C. 154(b) by 0 days.

(21) Appl. No.: 09/570,959

(22) Filed: May 15, 2000

(51) Int. Cl.[7] .................................................. B63H 9/04
(52) U.S. Cl. ............................ 114/102.33; 114/102.29
(58) Field of Search ......................... 114/102.31, 102.33, 114/102.29; 428/109, 110, 113

(56) References Cited

U.S. PATENT DOCUMENTS

| | | |
|---|---|---|
| 3,626,886 | 12/1971 | Cafiero . |
| 3,903,826 | 9/1975 | Andersen . |
| 3,954,076 | 5/1976 | Fracker . |
| 4,476,799 | 10/1984 | Bandy . |
| 4,593,639 | 6/1986 | Conrad . |
| 4,672,907 | 6/1987 | Smale . |
| 4,679,519 | 7/1987 | Linville . |
| 4,945,848 | 8/1990 | Linville . |
| 4,953,489 | 9/1990 | Bassett . |
| 5,038,700 * | 8/1991 | Conrad ............................ 114/102.24 |
| 5,097,784 | 3/1992 | Baudet . |
| 5,323,725 * | 6/1994 | Conrad et al. ..................... 114/102.3 |
| 5,333,568 | 8/1994 | Meldner et al. . |
| 5,355,820 | 10/1994 | Conrad et al. . |
| 5,403,641 | 4/1995 | Linville et al. . |
| 6,112,689 * | 9/2000 | Baudet ............................ 114/102.33 |
| B1 4,708,080 | 9/1990 | Conrad . |

OTHER PUBLICATIONS

Peter Isler, "Faster, lighter, smoother high–tech sails" *Sailing World*, Jul./Aug. 1997, vol. XXXVI, No. 7, U.S.A. pp40–44.

* cited by examiner

*Primary Examiner*—S. Joseph Morano
*Assistant Examiner*—Andrew Wright
(74) *Attorney, Agent, or Firm*—Fred A. Keire (57) ABSTRACT

Fiber-oriented sails, including a method of manufacture, wherein woven, laminated panels of oriented fibers are of oriented fill yarns, e.g., in a woven cross-cut panel and the fill yarns, from panel to panel define load paths such as from head to clew and head to tack of a sail.

11 Claims, 5 Drawing Sheets

WOVEN FIBER-ORIENTED SAILS AND SAIL MATERIAL THEREFOR

RELATED APPLICATIONS

This application is related to my previously filed applications Ser. No. 09/521,446 filed Mar. 7, 2000 now allowed and Ser. No. 09/520,246 filed Mar. 7, 2000 now allowed. In both applications the load path in the woven panels are defined by the warp yarns in the woven panels, that is, wherein the warp yarns from panel to panel in a sail define a catenary load path, for example from head to clew. In the present application, the fill (or weft) yarns in the woven panel define the catenary load path from panel to panel.

This invention relates to fiber-oriented sails. More particularly, this invention relates to fiber-oriented sails in which the fill yarns in a single panel are oriented from panel to panel following the load paths. Accordingly, warp and fill woven panels follow fill defined catenary load paths in a particular panel for a particular sail.

BACKGROUND FOR THE INVENTION

In chronological order in the past century, sails have been made of woven textile materials. Base fibers for these textile materials were derived from natural polymers, i.e., cellulose, of which cotton and linen were preeminent. In general, the fibers in these textile yarns used for weaving sailcloth were of short length as it is typically found in natural polymers. However, significant advantage in sails was realized by longer length fibers and high quality sails were sold as being made of long length "Egyptian cotton" yarns.

With the advent of synthetic fibers, that is an extruded bundle of "continuous" filaments for yarns, the length of fibers in yarns became immaterial, as typically all yarns were a bundle of "mono" filament yarns of substantial "fiber" length. Chopped fiber yarns or "spun yarns" were not used in sailcloth. Hence, the meaning of monofilament yarns, continuous filament fibers and yarns became interchangeable for sail making purposes. However, besides the fiber length in yarns, a synthetic filament in a bundle of monofilaments possessed many advantages such as initial modulus, tenacity, flex life, elongation at break, elongation resistance, resistance to creep, decay resistance, e.g., ultraviolet and mildew, weight-to-strength ration, etc. etc. These characteristics are for the modern filament yarns superior to the best cotton fabrics.

Accordingly, with the advent of continuous length filament fibers such as polyester and nylon (a polyamide), sailcloth are made of bundle of filament materials called yarns. Today substantially entirely all sails in economically advanced countries are made of synthetic fiber materials.

As new polymers were developed and as these lent themselves to filament formation and possessed the desirable properties for yarn formation, these materials found increasing use in sail making. For example, Kevlar™ (a polyaramid fiber sold by DuPont Co.) and Tawron™ (a polyaramid fiber sold by Akzo Co.) were used in sailcloth first with indifferent success, but as the fiber properties were improved such use became increasingly prevalent.

As new and improved derivatives of the above materials such as Kevlar 29™ and Kevlar 49™ and PEN polyesters (i.e., polyethylene naphtalate polymer) and entirely new synthetic fibers were developed with properties suitable for sail making, these materials found use in sails albeit at a very high premium over conventional polyester fiber fabrics. Examples of such monofilament materials are: Vectran™ (a polyaramid type of fiber sold by Hoechst-Trevira Corporation), Spectra™, Dyneema™, Certran™ (a high modulus polyolefin fiber sold by Allied Corp., DMS Company and Hoechst-Trevira Corporation respectively) and PBO (polyphenylene benzo bisoxazole) sold as Zylon™ by Toyoba Company. A considerable effort has also been expended to develop carbon fibers for sail making use, e.g., carbon fibers coated with a polyester or a polyamide polymer.

In sail making, when evaluating the above and novel fibers, the following tests are used:

Initial modulus: a measure of the yarn's ability to resist stretch. It indicates how well the fiber will hold shape, and is measured in grams of load per unit of stretch for a given denier. The higher the number, the less the stretch. Also defined as the slope of the initial straight portion of the stress-strain curve.

Tenacity: The yarn's initial breaking strength, expressed in grams of force per denier. This is a good measure of a fiber's ultimate strength. The higher the number, the more load it takes to break the fiber.

Flex life: A measure of the fiber's ability to retain its strength after being folded back and forth. It is expressed as a percentage of the fabric's strength lost after 60 bend cycles.

UV resistance: Expressed as the amount of time it takes for a yarn to lose 50 percent of its modulus; normally conducted with artificial UV exposure.

Elongation to break: A measure of the fiber's ability to resist shock loads. It is measured as how much a fiber will stretch (as a percentage of its overall length before it breaks.

However, despite the advances in synthetic polymer technology, the inherent shortcomings associated with woven technology are evident, i.e., 90 degree warp and fill orientation and the over and under shape of the warp fibers caused by weaving called "crimp." These inherent shortcomings cause considerable problems associated with sail shape distortion. Shape distortion is caused by the anisotropic properties of the material when the force is applied at less than 90 degrees to the fill and/or warp orientation. It should be noted that typically sailcloth is woven with the better properties in the fill direction as the warp yarns, because of the "crimp" in the yarns, do not have the same elongation characteristics as the fill yarns. To remedy the inferior warp direction properties, "warp inserted" fabrics were also produced. Within about the last 25 years considerable effort has been devoted to address the bias distortion in sails arising from the conventionally woven fabrics. This effort has had a three-prong approach. First, sailcloth manufacturers sought to improve the sailcloth by resin and heat treatment and resin applications. Additionally, sailcloth manufacturers added laminated films, typically a polyester film to the fabric on one, both sides, or in between two fabric layers. As the second approach, the sail makers employed panel orientation to align the fill threads with the load path, e.g., in tri-radial sails to minimize the bias inherent in a triangular sail typically used on recreational sailboats. Finally, as a third approach, sail makers devised structural sails (also known as fiber oriented sails) for racing; these were real "breakthrough" sails. For structural sails, the initial development was to place the structure in the form of fabric strips, bundled monofilament fibers, i.e., yarns or yarns in the form of tapes on the skin or membrane of the sail. These added structures followed the load path in the sail. The load or stress maps for a sail had been available to sail makers for a number of years. The whole structure was typically confined either on one side or the other side or both sides of the sail. A subsequent development confined the structure between two layers of a film.

Bias distortion as used in the sailing parlance is typically caused by a load (also force or stress) that is "off-the-thread line". That is, if the warp (or ends) and the fill (or weft) fibers are in a line with the major, predominant load, sails are said to have the stress "on-the-thread line," i.e., be less bias distorted. Typically, a sailcloth is woven with the fill threads under tension and therefore these do not suffer from the "crimp" of the warp threads. These fill threads are not as much subject to elongation as the warp threads when the sail is under load. However, in a typical sail there are other loads or forces "off-the-thread line". By adding a laminated film to the material, typically a polyester film or a poly vinyledene chloride film (e.g., sold under a trademarks Mylar or Tedlar, respectively, and produced by a Dupont Company), bias distortion was reduced because these films display substantially isotropic properties. Improved polyester films such as PEN, (which is a polyethylene naphthalate polymer, i.e., a type of polyester polymer), may also be used in a film form and is also available as a fiber. Composite films of more than one polymer may also be used such as disclosed in U.S. Pat. No. 5,221,569. As previously mentioned, the yarns may be substantially immobilized by hot calendaring, resin impregnation, resin coating, as well as the laminating with the above-mentioned films. Reduced anisotropic characteristics are thus obtained. Nevertheless, in sailcloth, bias distortions cannot be entirely minimized by the above described steps as dynamic loading of a sail is still not easily quantifiable in the various sections of the sail.

To overcome or reduce the bias distortion, sailcloth manufacturers also resorted to multi-ply sailcloth materials. These efforts have been made towards improving the warp characteristics by producing the so-called "warp insertion" materials and also by inserting composites in the X direction (the machine or warp direction and opposite to the cross-machine or Y direction during manufacture) the so-called X-Ply materials or diaxial material (hereafter X-Ply). The X-Ply materials are an open mesh in a form of a scrim or a scrim supplemented by parallel yarns. These scrim materials which have a fiber orientation at 90 degrees or less, at various angles to the warp, are typically placed across the fiber carrying the major intended load, and are covered with a polyester film in the sailcloth material. These multiple ply materials often carry, as the X-Ply material, expensive fibers such as Technora™ of Teijin Company or Vectran™. These multiple, composite materials carry the major load in the warp direction and are not only expensive but also rely on "over" design in the warp direction to over compensate for the bias distortion. Despite these weight and cost penalties, the X-Ply materials provide only, at best, an inexact, gross approximation to a load path when these materials are incorporated in a sail, typically in a gore form such as for tri-radial sails.

To minimize the cost of material and improve thread alignment, computerized nesting programs for cutting gores are available, i.e., for optimizing panel cutting such as for tri-radial sails. Still considerable wastage is experienced when making sails. Additionally, once distorted beyond a yield point, the films used in the laminate tend to break down or retain an irreversible shape without any recovery. Moreover, crinkling of the film and fabric composites and/or exposing these to sun also causes these materials to shrink to a greater or lesser degree. Bias distortion in these "panel optimized sails" is still introduced by the forces or stress exerted by aerodynamic loading of the sails as transferred to the "off-the-thread-line", and at boundary load concentration points, i.e., point loads of the sail. These stress concentration points consist primarily of a clew, head and tack points of the sail. Further, stress concentration is found at reef points, i.e., reef clew and reef tack, hanks, slides, battens, etc. In other words, the attachment means for the sail to a mast, stay, boom, or brace are typical stress concentration locations. These attachment points are also known as boundary point stress locations.

The reason for having repeatable consistency, i.e, properties in the warp, fill and bias e.g. 45 degrees direction for producing sailcloth and sails is made obvious when a distortion of two to four percent in a camber of a sail will result in significant performance differences. While a sail maker can measure the cloth properties in the machine direction and cross direction, i.e., or warp and fill yarns and has some confidence in the bias measurements, by experience, the consistency of available sailcloth material leaves a lot to be desired and leaves a sail maker at the mercy of a sailcloth manufacturer.

For the above reasons, the production of fiber oriented sails or structural sails (with added fabrics or scrim materials supplementing the primary yarns) has come to be regarded as the best present-day solution to the bias problem. These observations have been especially noticeable with respect to the high-end sails used for Grand Prix racing, e.g. America's Cup racing. However, the addition of the materials such as scrims and X-Ply materials to the fiber-oriented sailcloth has complicated already an essentially batch sailcloth and sail making process. Often, during sailcloth manufacture, each of the laminating, yarn insertion, and scrim insertion steps is a separate operation causing each to be a separate batch operation step with high labor content and with great increase in the cost of the sailcloth.

Still further, with the increased availability of the esoteric yarns, e.g., of fibers such as PBO, the cloth costs increase dramatically as represented by the actual yarns carrying the loads in a woven sailcloth. In the woven material, the yarns which do not carry the load are said to "run off" the material and are not continuous from panel to panel, i.e., are not joined along the curves of the load path. The "off-the-thread" material in essence only partially participates in the load bearing but contributes to bias distortion. Consequently, a great percentage of the yarns away from the 90-degree orientation in a cloth are carrying a disproportionately higher price versus their ultimate load-bearing capability. However, the recently adopted gluing of seams, as opposed to sewing, has displayed better load transfer properties between panels or gores.

When producing fiber-oriented sails, the sails are sought to be made with yarn orientation in the sail in a manner such that the properties in each section of the sail are predictable and properly balanced. For "balance" considerations, the starting point is based on the available stress maps or load-path maps which give the principal stress and/or principal load paths and stresses about perpendicular to the principal stresses known as secondary stresses or secondary load paths.

The most sophisticated software systems currently used for sail design combine a finite element analysis to model stresses within the sail membrane, with numerical flow codes to predict pressure variations over the curved sail surfaces. The two subprograms must be closely integrated because any sail shape change will alter the pressure distribution, and vice versa. Mainsail and headsail also interact aerodynamically to add another dimension of complexity.

Using these tools, a skilled designer can, in principle, fine-tune the curves of a sail so that the entry angles will harmonize with flow at every point up and down the luff as well as define the vertical camber at any location. Camber deflection analysis is also available as a design tool.

Using the computerized stress modeling, the engineering of the sail can be optimized in terms of fiber density and orientation. Areas of maximum load or potential overload can be identified and subsequently reinforced. By the same token, lightly stressed zones can be pared down in the quest to save weight for Grand Prix racing sails.

As discussed above, in a sail, in different parts thereof, stress is experienced in a multitude of different directions. In a woven sail material, the balance consideration of properties requires that the optimum or least anisotropic properties are consistent from one batch of sail material to the other. A good sailcloth is said to be "flat," i.e., has been weaved with consistent tension in the warp and fill, producing no "bumps" or "bubbles." Further, the material properties are said to be of the same value, i.e., magnitude, for example for modulus, stretch or elongation, bias distortion, etc. Any change or deviation from batch to batch of the sailcloth material (or fiber oriented sail material) distorts the sail unpredictably and causes the sail to perform unpredictably. Accordingly, if each sail material batch has different properties, the sail design cannot be made consistent. As mentioned above, by experience, it has been found that the horizontal depth or curvature of a mainsail, i.e., horizontal camber by as little as two to four percent will cause a significant change in the performance of the sail. Likewise, the change in the vertical camber will have drastic consequences in performance. The loss of performance is magnified if the curvature or camber migrates to a location in the sail different from that for which it was intended, e.g., towards the leach of the sail. For these reasons, eliminating variability and having predictable properties in a batch of conventional or fiber oriented sail material have been desiderata of all sail makers.

In the production of fiber-oriented sails, the consistency in yarn properties, the consistency of the structure, and the final laminate is just as much of importance as with woven sailcloth materials. As the design of the fiber oriented structure in a sail is still bound up with considerable intuitive art, the predictability, while significantly improved over woven-material sails, nevertheless allows for great improvements in the component parts of the structure. Although development of structural, i.e., fiber-oriented sails in effect freed the sail maker from the sailcloth manufacturer, it placed a greater burden on the sail maker to produce consistent materials. Some of the alleged improvements such as "round" fibers versus flat fibers, twisted fibers versus untwisted fibers, mixed fibers, etc. etc. have been more or less of defensive posturing type rather than based on proven results. Nevertheless, the reduced costs in structural sails designed with substantially all of the fibers of the filament yarn type carrying the load has been a notable advance.

However, the experience on race courses has shown that initial fiber oriented sails were insufficiently strong when only primary yarns followed the load paths for the principal or primary stress. If no other than primary yarns were present and if the substrate, i.e., skin membrane was weak, i.e., a polyester film, the sail was distorted. In other words, distortions due to aerodynamic loading had to be prevented by introducing complex secondary structure, i.e., a strong membrane or secondary structural members to prevent distortion.

Distortions in fiber oriented sails appeared mostly but not exclusively in the horizontal direction, i.e., across the sail. Adding more primary yarn structure, and a scrim or taffeta combination has been an answer, albeit, an imperfect answer. Addition of scrim requires a separate manufacturing step and today two principal structural sail manufacturers, Sobstad, Inc., selling sails under the trademark Genesis and North Sails, Inc. selling its structural sails under the trademark 3DL, insert a layer of reinforcement, e.g., a scrim as a separate step in the sail/sail material manufacturing process. Both processes are not amenable to inserting a scrim as a bottom layer in a sail material during manufacture. The third structural sail manufacturer Ulmer-Kolius known as UK Sailmakers selling Tape-Drive™ sails uses a cross-cut panel sail of conventionally woven material or an X-Ply improved material to place a structure on it.

BRIEF DISCUSSION OF PRIOR ART

The two principal processes for making the fiber oriented or structural sails are represented by U.S. Pat. Nos. 4,593,639, 4,708,080, and 5,355,820, assigned to Sobstad Corporation (U-K Sailmakers have been licensees of Sobstad Corporation) and U.S. Pat. No. 5,097,784 assigned to North Sails, Inc. Neither of the two processes lends itself readily to continuous manufacture of sails. Neither the Sobstad nor the North Sails processes are amenable to a more streamlined production of a sailcloth material. While the 3DL™ process. is a more direct material-to-sail process, it requires for heavier use sails a scrim insertion and vacuum lamination steps, on a mold, as separate discontinuous steps for the final sail material production. In the production of sails under the Sobstad process, the fabricated sail material must still be subsequently laminated in a separate step as shown in U.S. Pat. No. 5,355,820 with a scrim insertion during lamination. Neither process inserts a scrim between the fibers and bottom film, thereby resulting in an unbalanced sail material. While each of the prior art methods has its benefits and short comings, the separate layering of the scrim on top of the primary structural fiber members on a mold introduces additional problems such as sufficient temperature and pressure for laminating, conforming of the film to the structure, and adhesion of the film material to the structure. In the 3DL™ method disclosed in U.S. Pat. No. 5,097,784 besides the above inability to laminate a scrim between the bottom film and fibers, the complexity resides in the mold contour control, the pre-shaping of the film and scrim in panels which then must be placed on the mold, and the inability to vary economically the yarn content or mixture from place to place in the sail as needed and the complexity in the fiber orientation to produce an approximation of the primary and secondary load paths.

With reference to sails made by woven materials, i.e., 90 degree woven material sails, the following patents have sought to approximate some fiber orientation by 90 degree woven materials or by parallel warp and parallel fill woven materials. For example, in U.S. Pat. No. 3,626,886 to Califiero, the fiber orientation along the leach of the sail is skewed vis-à-vis the warp. The fibers, however, are not properly oriented along the load paths such as at luff and leach to define the catenary load path found for load paths shown in U.S. Pat. No. 5,097,784.

Similarly, U.S. Pat. No. 3,903,826 to Anderson defines a triaxial weave, but the sail material suffers from imprecise alignment of the yarns along the load paths and excessive elongation because of the increased amount of crimp in the three directions of the sail material.

U.S. Pat. No. 4,476,799 to Bandy discloses load paths approximation by 90 degree woven material and fails to disclose cross cut panels, that is, panels clear across the sail wherein the fill fibers follow the load paths in the entire panel across the sail.

U.S. Pat. No. 4,672,907 to Smale discloses the same load paths approximation disclosed in the patent to Bandy but with increased number of panels seeking a further improved load paths orientation by increasingly complex approach labor and material wise. Both patents to Bandy and Smale further disclose sail material where the threads are off the thread line.

U.S. Pat. No. 4,953,489 to Bassett discloses sail material orientation and a sail where the thread line seeks to follow the load path. However, the woven material is 90 degrees woven material and it requires progressive rotation of small sub panels incorporated in a tri-radial sail. The numerous sub panels required for producing a sail from 90 degree woven material increases the labor cost and waste and still causes the yarns to run off to a greater or lesser extent in each of the gores.

With the increasing complexity by which the prior art has sought to define the load path, the labor costs and the material wastes has also increased significantly. Hence, it has been a desideratum to simplify the making of the material thereby simplifying the making of the sails. These and other shortcomings of the prior art have been minimized by the present invention as will now be described.

BRIEF DESCRIPTION OF THE INVENTION

It has now been found that the prior art difficulty of defining the catenary load paths by 90 degree or parallel yarn woven or non-woven materials may be significantly minimized if not entirely overcome by weaving individual panels for an individual sail wherein the fill yarns in the panel define in the sail the curved catenary load path from panel to panel in a sail such as at the luff and at the leach. Subsequent lamination with a film such as Mylar or fabric such as taffeta, improves the woven material still further and provides a suitable well-balanced sail material for incorporation into a sail. Sails made from the sail material have the same advantages as prior art fiber-oriented sails without a number of manufacturing disadvantages thereof. The panels may be woven in greater or lesser widths so as to approximate the curved catenary load paths in a simple and elegant fashion for each of the sails.

The method of weaving allows the warp yarns in the panel to be parallel or substantially parallel from panel to panel from the head panel to the next to the last panel. For the last panel, sub panel weaving is practiced so as to provide for better load paths approximation.

The simplicity of defining the load path by specifically woven panels for a specific sail provide the following benefits.

1. Sailmakers may shape, i.e., broad seam, the novel panels in the traditional manner. For added benefit, a selvage may be provided in the weaving process to also allow sewing (besides the increasingly prevalent gluing of seams).

2. Individual panel production may be achieved by weaving with varying fill-yarn densities and fill-yarn types or mixtures of types from panel to panel.

3. Fill-yarn orientation in a panel as it is being weaved may be achieved both for luff and leach sections in a single panel by varying the angle(s) for the fill yarns throughout the scrim-like material.

4. Extra or multiple fill yarns may be pre-determinedly selected for high stress areas of the sail when the sail material is woven. In the areas such as the head, clew, or tack, high-load bearing yarns of carbon fibers, PBO, Kevlar, etc. may be used.

5. The woven scrim-like, variable angle fill-oriented material may further be balanced wherever necessary by lamination with a film for e.g. Mylar or by Mylar-backed Diax™ or X-Ply™ materials for refining the secondary stress or load bearing patterns in a sail. Such balance is generally desirable in the curved areas of the sail. In the flat areas of the sail, such as in the small area of the head, clew, leach, the sail has predominant forces substantially aligned with each other either in parallel or radiantly. In the curved areas, the secondary stresses are substantially multi-directional and besides the warp yarns, the secondary stresses may thus be supplemented, if necessary, by the above supplemental materials.

6. The woven panel production rates capable by the presently disclosed invention may be significantly faster than individual fiber placement or bundled fiber placement practiced by the prior art when making structural sails.

7. Fill yarn density in the panels may be readily varied on a full production basis by a multiple of shuttles and/or shuttle runs and/or reeding the fill yarns, at the same time achieving desired warp yarn tension and/or fill yarn tension so as to balance better in the woven material the woven scrim properties.

8. Both large diameter and small diameter fill yarns and/or warp yarns may be let off the yarn bobbins without twist so as to achieve flat yarn weaving for fibers such as carbon fibers. Conversely, predetermined twist may be introduced by appropriately feeding the selected yarn from the bobbins.

9. Other and further advantages will become evident in the detailed description of the invention, embodiments, and/or the drawings.

BRIEF DESCRIPTION OF THE DRAWINGS

With reference to the drawings herein which depict various aspects of the invention and embodiments thereof, the illustrations of the same are as follows.

DETAILED DESCRIPTION OF THE DRAWINGS, THE INVENTION AND EMBODIMENTS THEREOF

Figure 1:
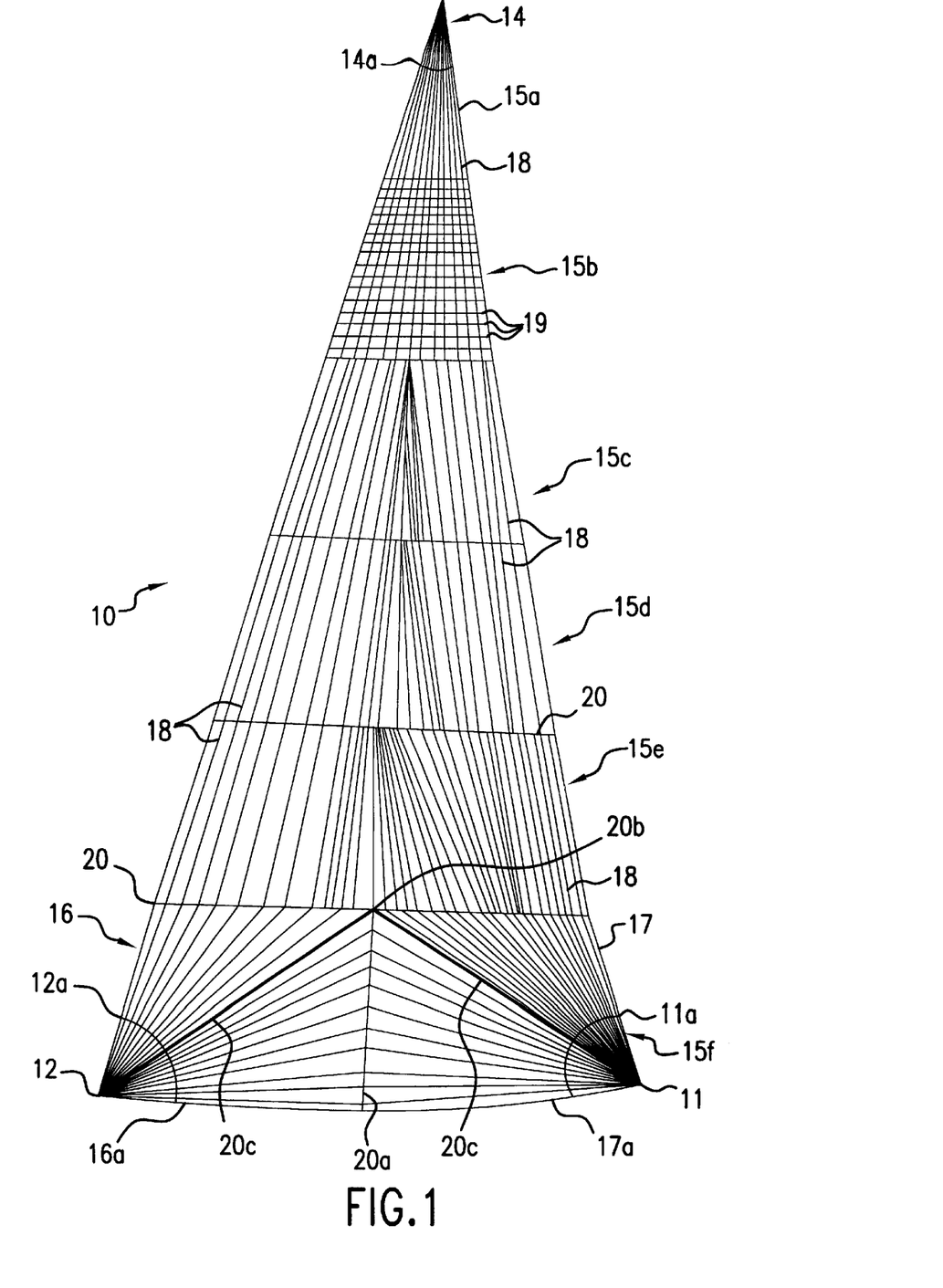
FIG. 1 illustrates in a plan view a typical genoa or jib sail schematically depicting the fill-oriented catenary load paths in a sail.

With reference to the drawings where like elements have been identified by the same numbers in the figures, FIG. 1 herein shows a typical genoa 10 also called a jib sail. Genoa sail 10 has a clew 11, a tack 12, and a head 14. On the right side of the sail 10, between clew 11 and head 14 is an indefinite width area called a leach (not identified by a number). On the left-hand side of the sail 10, between tack 12 and head 14, is an indefinite width area called a luff (not identified by a number). Above and below an imaginary line between tack 12 and clew 11, is again an indefinite size area called the foot (not identified by a number). Typically, the luff and leach areas may be considered about one third the size of the panel in the horizontal direction.

In FIG. 1, the panels in the sails have been shown as 15a to 15f. Foot panel 15f consists of four sub panels 16, 16a, 17, and 17a respectively. These sub panels are indicated by the seam 20, the center seam 20a, the seam point 20b and the heavy lines in the panel 15f to depict the sub panels and interior seams 20c. Each of the corners, i.e., clew 11, tack 12, and head 14 has a clew, tack, and a head corner patch 11a, 12a, and 14a respectively.

In a schematic manner, fill yarns 18 have been indicated in each of the panels by the diverging lines 18 (or converging lines based on the viewers perspective). The fill yarns are typically high tenacity fibers such as aramid, e.g., Kevlar™, polyester, PBO; carbon; polyalkylenes, e.g., Spectra™; etc. The fill yarns are from 150 denier to 2000 denier (0.05 gr/450 m standard denier). These fill lines 18 in the drawings herein typically represent the load paths in a sail and in theory are continuous from head 14 to clew 11, from clew 11 to tack 12, and from tack 12 to head 14 because of gluing and sewing. These lines approximate curved load paths lines sometimes called catenary lines. By applying tension, e.g., to clew 11 and head 14, which are also called point load locations, the tension tends to straighten out the fill defined load paths overcoming the aerodynamic distention of the surface of the sail and thus preventing the sail structure from excessive distention or movement. If the sail 10 changes its design shape, it tends to be "slow" because the aerodynamic load is not directed in the proper "lift" direction but is directed in the "heel" direction as it is known in the sailor's vernacular. The actual, physical phenomena involved are more complex but need not be discussed herein. For the above reasons, it has become increasingly important to have "fiber orientation" in the sail because the fibers, if properly oriented along the load paths in the sail, prevent the aerodynamic load from improperly distending the sail and thus making it inefficient.

In FIG. 1 for panel 15b, typical warp yarns are indicated as 19. These warp yarns 19 are substantially parallel to each other in the panels 15a to 15e and (except for 15f consisting of the sub-panels 16, 16a, 17, and 17a) run from luff to leach in a sail 10. Warp yarns are typically of polyester polymer yarns, aramid, Vectran™; Technora™; polyethylene polymer e.g., Spectra™ and mixtures of same. The warp yarns are from 150 to 2000 denier (0.05 gr/450 meter standard denier).

Figure 3:
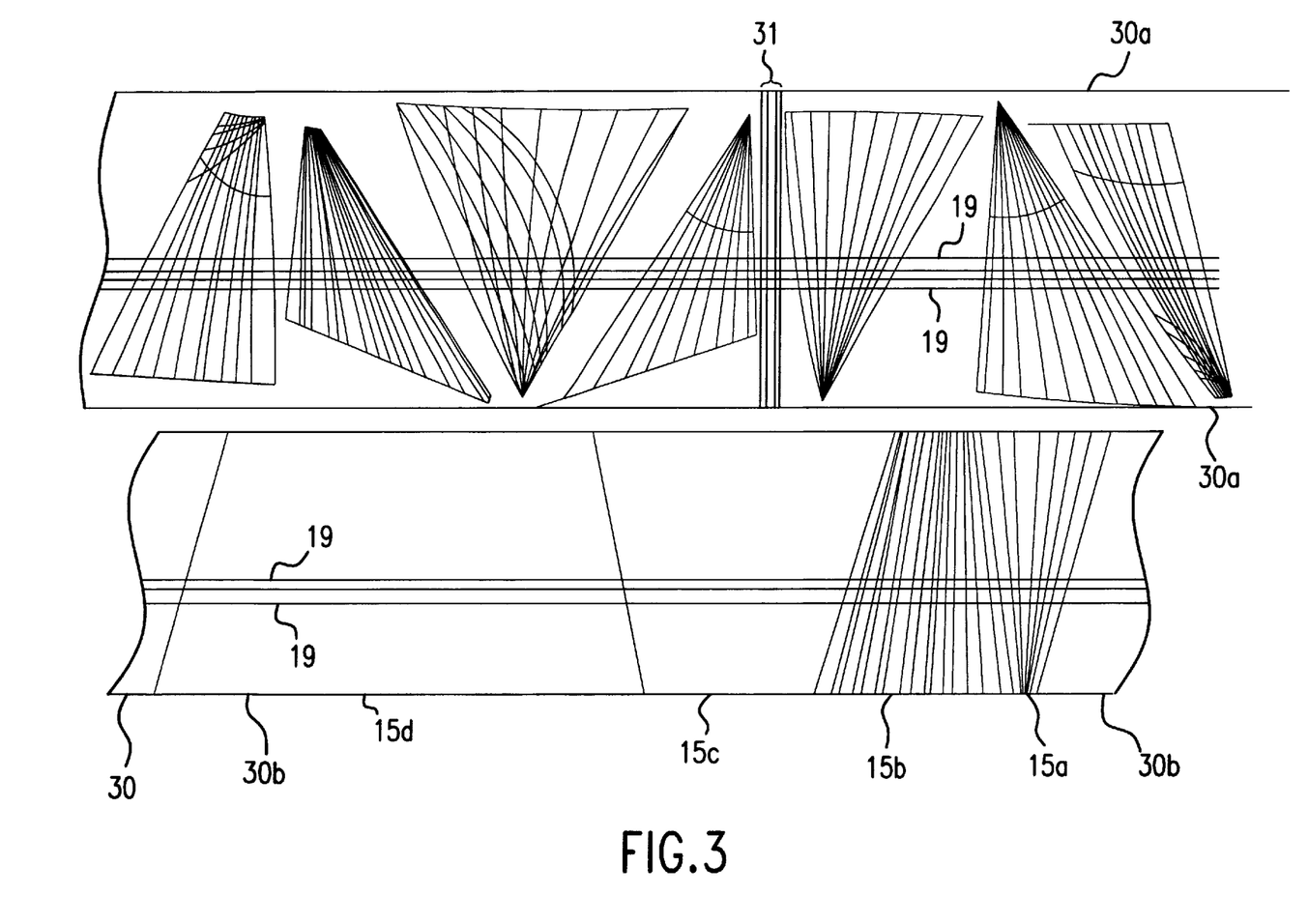
FIG. 3 illustrates in a plan view a panel nesting arrangement for the scrim like material as it is produced on a loom wherein in each sail panel, the warp yarns are in the traditional, parallel machine direction and the fill yarns are in the novel arrangement in the woven sail material.

Because of the load paths in sub panels 16, 16a, 17, and 17a, these are woven on the loom in the manner as shown in FIG. 3; these sub panels are distinct from the other panels as also shown in FIG. 3. Hence, the fill 18 and warp yarn 19 orientation in these sub-panels are different.

As a distinct embodiment, the foot panel 15f may also be made as disclosed in my two pending applications Ser. Nos. 09/521,446 and 09/520,246; the disclosures for that aspect of the invention are incorporated from the above applications in the disclosure herein. It should be noted that the warp yarns in the panels in the described applications must be properly matched and joined with the fill yarns herein by seams or overlappingly laminated for the woven foot panels 15f in the assembly shown herein.

Figure 2:
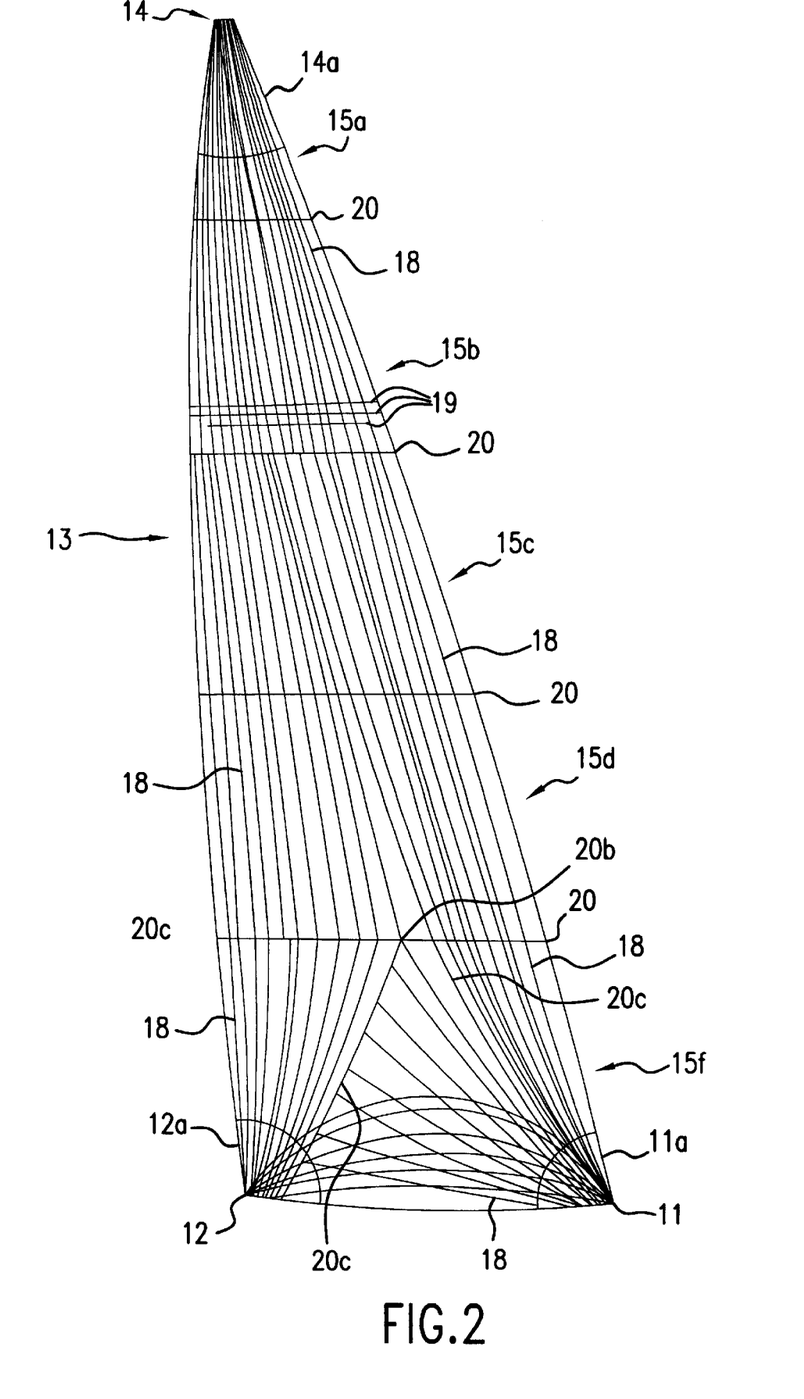
FIG. 2 illustrates in a plan view a high-aspect ratio mainsail wherein the load paths have been schematically depicted by the curved catenaries defined by the fill yarns in each of the panels.

FIG. 2 illustrates a mainsail 13 consisting of panels 15a, 15b, 15c, 15d and 15f. The foot panel 15f for sake of consistency has been indicated as 15f the same as in FIG. 1. The foot panel 15f illustrates the combination of three sub-panels and a laminated overlay panel, accordingly, in FIG. 2 the three sub-panels are indicated by seam 20, interior seams 20c, and the joined seam point of seams 20 and interior seams 20c, identified as 20b, clew 11, and tack 12. The first sub-panel is defined by 12, 20b, and interior seams 20c, and the third sub panel is indicated by clew 11, interior seams 20c, seam point 20b, and seams 20. The overlay panel is indicated by the upper curved line extending from tack 12 to clew 22 and the bottom of the foot panel 15f running from tack 12 to clew 11. The fill yarns are shown as 18. Schematically, in panel 15b, the warp yarns are shown as 19. For panels 15a to 15d, the warp yarns tend to run in these panels substantially parallel to the foot seam 20.

In FIG. 3, a continuous web 30 consisting of two parts, i.e., upper and lower web 30a and 30b respectively has some of the nested panels 15a to 15d for the genoa in FIG. 1 woven in a manner as will be explained further in discussion of the disclosure in FIG. 5.

The warp yarns, 19 a few of which are shown schematically in FIG. 3, run for the length of the web 30 in both the upper web 30a and the lower web 30b. The upper web 30a is a continuous part of lower web 30b and has the nested sub panels for the sails of FIGS. 1 and 2. The panel arrangement in the upper web 30a is only illustrative and other and various arrangements are possible including weaving the panel with the face up or face down configuration. In any event, an apex of a panel carrying the most yarns resides on one of the edges of the web 30a. Also the fill yarn orientation in the web at the high-yarn density apex should be preferably greater than 45 degrees (greater than a 45 degrees slope) vis-a-vis the web edges. As the reed angles vis-à-vis the web edges decrease from 90 degrees to 45 degrees, the warp width of the web gets squeezed, i.e., shortened by the reed 46, which makes weaving more difficult. When weaving a scrim, such distension or contraction may be tolerated for up to about 45 degrees but interspersed bands of 90 degree woven material, that is, spacer bands 31 may be necessary to achieve the required dimensional integrity for each of the sub panels shown in web 30a. Conversely, smaller width sub-panels may also be weaved. As it is evident from the above drawings, e.g., FIGS. 1 and 2, the scrim size may vary for the woven material based on the number of yarns per inch of warp and fill. In the high stress areas such as at the clew, the yarns are essentially closely woven. At the other end of the scale, the yarns are from 2/inch to 8/inch and are based on the sail type, i.e., light, medium, or heavy weather sails, and sail size. Smaller sails require fewer yarns per inch and larger require more yarns per inch and also larger denier size yarns. Similarly, heavy weight sails require larger denier size yarns.

Although interspersed spacer panel 31 have not been shown for the web 30b, the fill density at the apex in panel 15a may require a spacer panel. Further, the orientation of sub-panels in web 30a is only illustrative as the warp orientation as developed by experience will indicate the sub panel orientation during weaving and thus a nesting position on web 30a. As the secondary yarn structural development is still in the "art" stage in fiber-oriented sail making, it is to be understood that variations in the final product arrangement on web 30a may be entirely different and based on each sail maker's preference and supplemental materials employed for each panel in each sail. It should be noted that considerably more material will be trimmed off from web 30a for some of the woven sub-panels.

Figure 4:
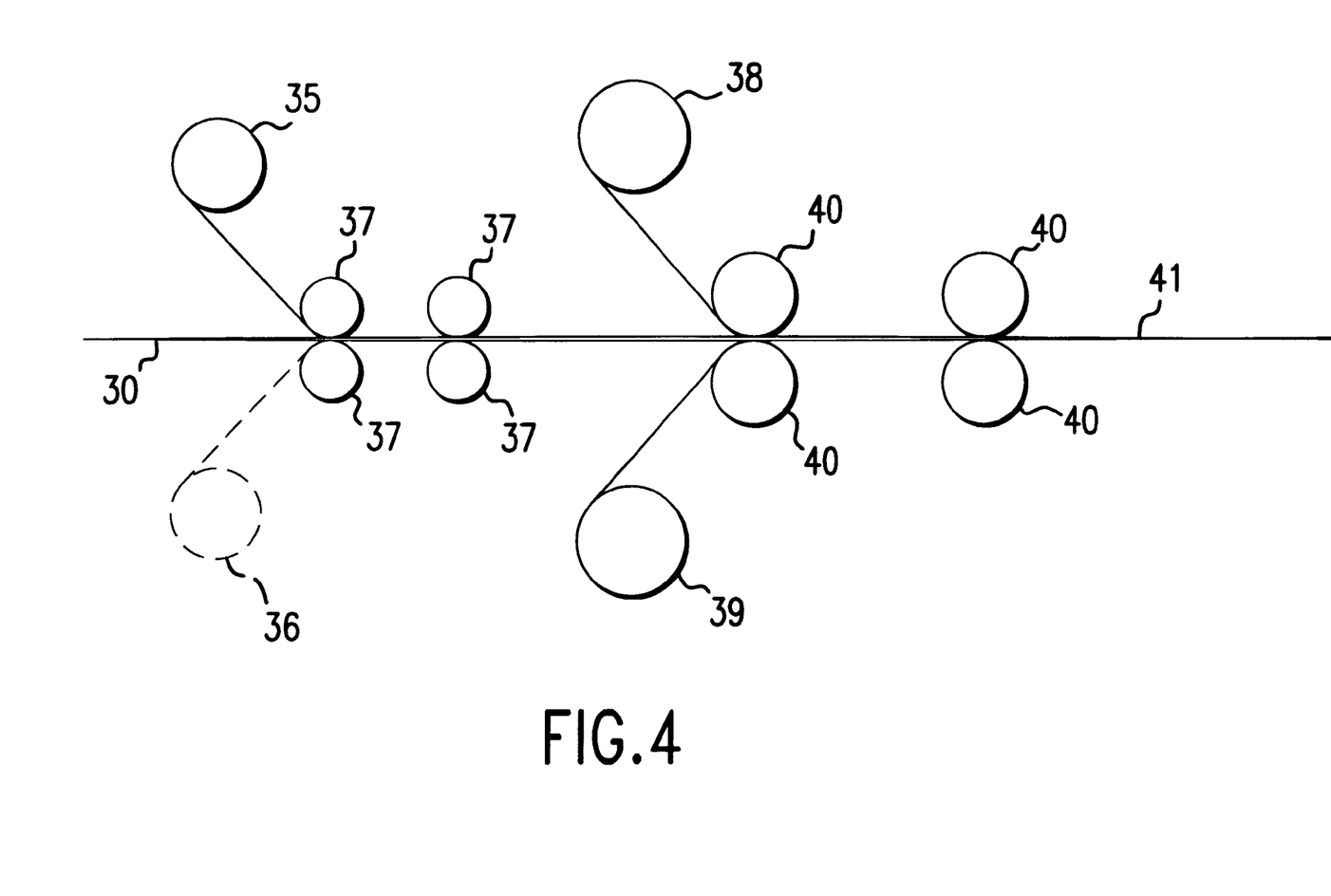
FIG. 4 illustrates in a schematic cross sectional view a laminating process for converting the loosely woven scrim material in a material suitable for incorporating into a sail.

FIG. 4 illustrates schematically in cross section the subsequent work up of the woven panels by lamination. The final product is trimmed and cut and then incorporated into a sail such as shown in FIGS. 1 and 2. Web 30 may be supplemented as discussed above by either a single or multiple layers of materials such as the various Diax™ or X-Ply™ materials in various weights, grades and configurations. These materials are schematically shown by supply rolls 35 and 36 respectively. Currently most lamination is sought to be done with heat activatable resins on yarns or on films because of OSHA and/or environmental concerns. Hence a pair of heated rollers 37 are used to effect the lamination. In the event glues are used in the lamination, glue transfer to the film is well known and has not been shown herein. The films may range in thickness from 0.5 mills to 2 mills; typically film thickness is from 0.75 to 1.25 mills.

If only one side of the web 30 is laminated with the Mylar-backed X-Ply material as stored on roll 35, then roll 36 may dispense only a Mylar film and the subsequent lamination may not be necessary. However, if only an X-Ply material is used in a non-film backed form, then heat activatable resin coated Mylar film stored on rolls 38 and 39 is used to finish the web 30 by laminating with a pair of heated pressure rolls 40. The final laminated form of the woven and laminated material has been identified as 41 and is the material used in the making of a sail.

In order to facilitate the broad seaming and gluing and/or sewing of the seams between each of the panels, the warp edges of the panels in web 30b may carry strips of release paper (not shown) throughout the lamination process. Likewise, to provide for sewing and gluing of seams, the panels such as in web 30b may have a selvage, that is, more dense warp threads woven into it at the edges thereof. Although selvage weaving complicates and makes weaving more expensive the essentially simple weaving process described herein, the traditionalists in the sailing industry have found it difficult to accept glued seams. The present fiber oriented sail panels should increase the acceptance by a wider public.

Figure 5:
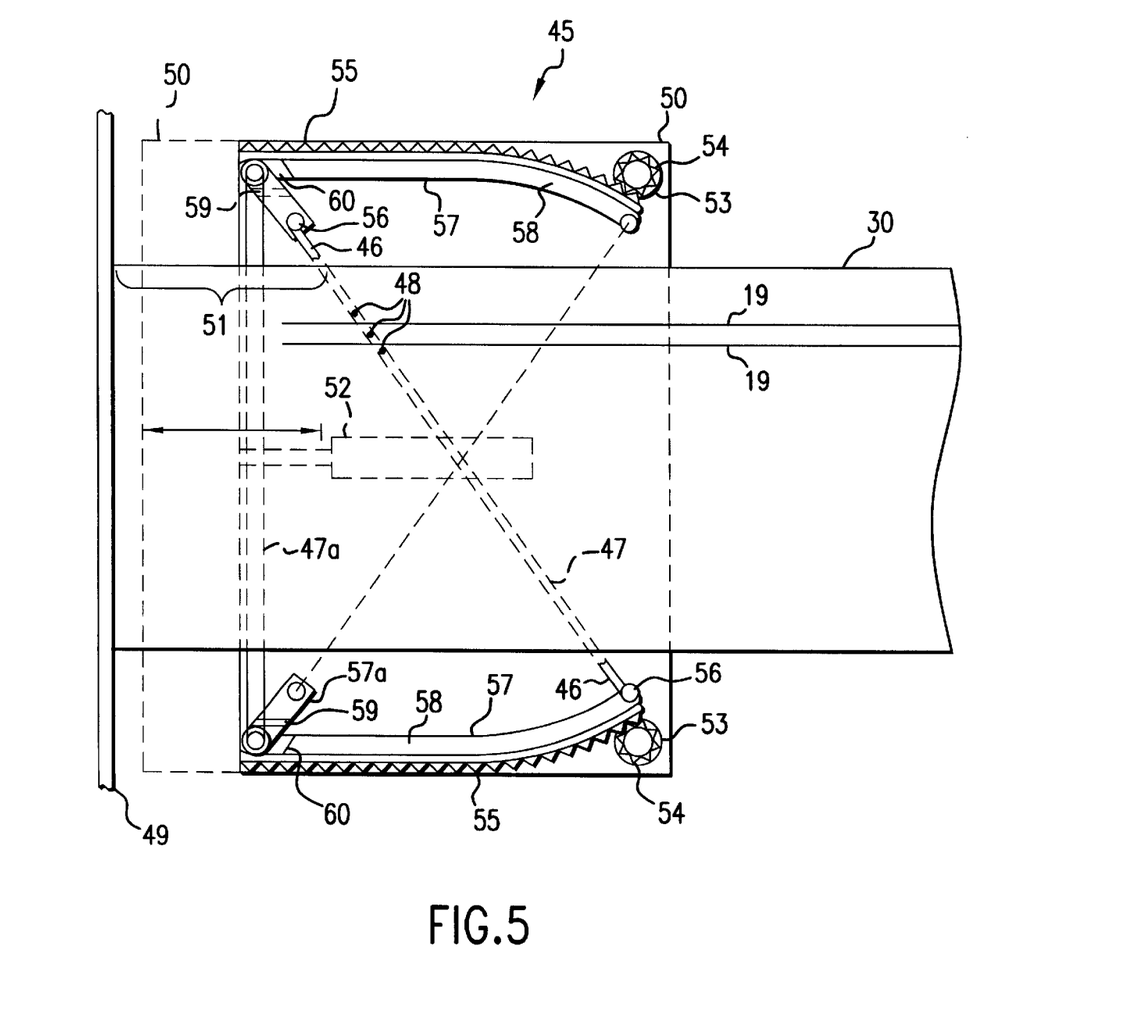
FIG. 5 illustrates in a schematic top view an arrangement of a reed section for a loom, a shed section for a shuttle run, appropriate reeding and beating up of the fill yarns, and the machine therefore.

In FIG. 5, a top plan view illustrates an embodiment and variations thereof of making variable-angle fiber-oriented. i.e., variable angle, fill-oriented sail material in a continuous web form such as shown in FIG. 3. Only the reed section 45 has been shown as the warp in web 30 is only slightly distended in the cross machine direction when beating up the fill. The reed frame 46 has been shown schematically and for it the schematic reed bottom rib 47 has been illustrated. The reed frame 46 is a bottom-driven articulated arm, top supported reed frame. Comb members 48 maybe heavier than in normal weaving, i.e., wire or strip of metal, as fewer dents per inch are employed for scrim weaving. Thus, the comb members 48 are fairly large.

In order to accommodate both the left and right side sloping fill yarn orientation such as at the luff or leach of a sail shown in FIG. 1, the reed frame 46 and the reed bottom rib 47 must travel both left and right from a dead center position. The dead center position is shown by the phantom lines 47a that place the reed frame 46 at substantially 90 degrees to the warp yarns 19. When at the dead center position, the reed drive platform 50 as shown on the left FIG. 5 by the phantom lines is urged towards the heddle(s) 49 by the pneumatic or hydraulic beating means 52. Other beating means may be employed such as cranks, cams, and the like as it is well known in the art. Only one heddle 49 has been shown. The heddle (s) 49 define the warp shed, which has been indicated for a panel apex, by a bracket at the top of the web 30 in FIG. 5. When making large slope panels (e.g., close to 45 degree), the far end of the shed starts at the far point of the web 30 for that panel to where the warp yarns have been let off and then, after a few shuttle runs ends at the apex point. Consequently, the heddles 49 are in rigid frames.

In order to achieve right sloping fill placement such as for the leach area for the sail in FIG. 1, for example, as a truncated apex for panel 15b or 15c, the reed frame 46, i.e., the reed bottom rib 47 has fixedly attached thereto a DC motor 53 carrying a solenoid retractable pinion gear 54 riding on the pinion rack 55. A captured cam follower 56 attached to the reed frame 46, e.g., to reed bottom rib 47 rides in the cam race 58 of cam 57. Cam follower 56 cannot enter the short cam leg 57a as a short cam race plunger 59 blocks the entrance to the short cam leg 57a. Similarly, at the top of FIG. 5, the long cam race 58 of cam 57 is blocked by a short cam race plunger 60 for the long cam race 58 of cam 57. When retracted, plungers 59 and 60 form a smooth surface in the cam race 58 for the cam legs 57 and 57a. Cam race plungers 59 and 60 may be activated by pneumatic means or by a solenoid attached at the bottom of reed plate 50, the details of which have not been shown.

A mirror image pair of long and short cam race plungers 59 and 60 are provided on either side of the reed plate 50 for the reed frame 46 to be oriented depending on the fill yarn orientation. The plungers 59 and 60 may also be activated to maintain the reed frame 46 in the bottom of the reed plate 50 in the 90-degree position that is typically at the middle of the longer panels. Depending on the slope of orientation of the fill yarns, the reed frame 46 may lead or lag an apex edge of a panel. Consequently, the mirror image operation of the beating up is conducted as described above for right-hand or left-hand sloping fill yarns.

It should be noted that if the angle for the slope at which the beating up occurs is nearing 45 degrees, the warp 19 in the web will be necked down. However, if the difference is split, that is, the reed 46 distends the warp by one half at the dead center position 47a and by half at the neck down position, the difference may be tolerated when weaving the sail material. Moreover, a wider warp may be provided, such that the desired width for web 30 is obtained. A slight weave pattern in the warp is acceptable because the warp constitutes the secondary structural elements in the sail material according to the present invention.

However, as another embodiment, the reed members may be grouped in a multiple of comb sections such as shown for the warp-oriented sails in my above-identified application which are incorporated by reference herein for that feature for the reed comb adjustment. For such embodiment, the reed frame 46 including the cam followers 56 and the D.C. motors are fixedly mounted on a frame and the reed comb members 48 are adjusted within the frame. Such adjustments may be necessary for making the sub panels for a large foot paneled sails such as for a large genoa or a mainsail. Again, as mentioned before, such problem can be minimized or avoided if weaving of narrower sub panels is practiced. In order to speed up the return of the reed frame 46 to the dead-center 47a position for each shuttle run, the reed frame 46, may be returned to the dead center by a pneumatic cylinder (not shown) or by a two speed D.C. Motor 53 which has a fast return and a slower beating up speed.

Inasmuch as only the reed section 45 needs to be controlled in a manner different from the control of all other weaving operations, the existing loom control technology may be used herein for all other functions of weaving. For example, the yarn beam, the warp and fill tensioning, the heddle arrangements, the cut-off and take-off means, etc. etc. are all conventional and freely available in the art.

For the reed section 45, conventional shuttle and shuttle drive technology may be employed. The actual steps in the operation of the reed section 45 may be controlled by a multifunction programmable control device available from Siemens Corp. of Nutley, N.J. The stepwise operations of the reed section 45 in the beating up process have been described above in great detail. The sequencing of the reed operation to form the shed fits into a traditional two heddle weaving operation, but additional heddles may be employed such as for the sub-panel weaving for the apex points, e.g., described in reference to the panels in web 30*a* in FIG. 3.

As a scrim type open weave is typically woven for the panels shown in FIG. 3, web 30*b*, the dense apex points for panel 15*a* and the panels in web 30*a*, can utilize additional heddles in weaving the panels in the high density yarn areas of the panel. In any event, the solution of the scrim aperture size and yarn density varies for different sails, e.g., light weather sails and heavy duty, heavy weather sails such as #3 and #4 jibs and storm sails. As described before, the aperture size, i.e., yarn density and yarn size, especially with reference to the secondary structural yarns, i.e., warp yarns, may easily be designed for the specific sails. When series producing sail panels suitable for the duty suited for the sails, i.e., heavy, medium, or light, the design of the structural components is easy and fast when compared to the prior art processes.

Having thus described the invention herein and various embodiments thereof and without limiting my invention by the examples and embodiments but intending to claim all reasonable equivalents for the present combination not within the prior art, the claims herein are for the purpose of defining the invention.

What is claimed is:

1. As an article of manufacture, a yarn-oriented sail comprised of a number of specifically woven sail panels, wherein at least a majority of said specifically woven sail panels are of a specifically woven material of fill yarns and warp yarns wherein said fill yarns in said specifically woven material are fill yarns of nonparallel orientation in each of said majority of woven sail panels and are along primary load paths specific for each of said majority of specifically woven sail panels, said majority of specifically woven sail panels extending from luff to leach for each of said majority of specifically woven sail panels in said sail when said sail is in use for its intended purpose, and where in said fill yarns within each of said majority of specifically woven sail panels are of opposite slope at said luff versus said leach in said specifically woven sail panel.

2. The article of manufacture as defined in claim 1 wherein the majority said specifically woven sail panels in said sail have specific fill yarns in said specifically woven material for each of said panels, wherein said specific fill yarns for each of said majority of panels follow a plurality of load paths from panel to panel in said sail and define load paths from head to clew and from head to tack of said sail.

3. The article of manufacture as defined in claim 1 wherein said fill yarns in said specifically woven material are fill yarns of non-parallel orientation and follow primary load paths of a sail; and wherein said fill yarns are of an aramid polymer, carbon, PBO polymer, polyester polymer, or a high tenacity polyalkalene polymer.

4. The article of manufacture as defined in claim 3 wherein said fill yarns in said specifically woven material are fill yarns of ararnid, PBO, polyester, or high tenacity polyethylene polymer and wherein warp yarns in said specifically woven material are of an aramid, high tenacity polyethylene polymer, PBO polymer, or a polyester polymer.

5. The article of manufacture as defined in claim 1 wherein fill yarns in said specifically woven material in each of said majority of sail panels are oriented to follow along principal load paths in said sail, said fill yarns are substantially non-parallel, said fill yarns with said warp yarns are substantially in the form of a scrim; and wherein said scrim is in a laminate having at least on one side thereof a film of at least one polymer of high tenacity.

6. The article of manufacture as defined in claim 1 wherein in said laminate said film is a polyester polymer film and said laminate has at least a further layer of an X-Ply or Diax material.

7. In a method for constructing a sail of yarn-oriented sail panels, the steps comprising:

weaving a series of sail panels, each sail panel being specific for said sail, wherein fill yarns in each sail panel are oriented along principal load paths for each of said sail panels when each of said sail panels is incorporated in said sail;

laminating said series of sail panels sail with at least one film or a yarn reinforced film; and assembling into a sail said series of sail panels by broad seaming each of said sail panels being specific for said sail, wherein woven fill yarns in said panels being specific for said sail follow principal load paths in said series of sail panels from sail panel to sail panel in said sail.

8. The method as defined in claim 7 wherein said weaving of a series of sail panels each being specific for said sail is by varying, during weaving, in said each sail panel being specific for said sail, an angle for said fill yarns from a right-handed slope in a leach area of said each sail panel being specific for said sail to a left-handed slope for said fill yarns in a luff area of said each sail panel being specific for said sail.

9. The method as defined in claim 7 wherein sail weaving of said series of sail panels is by varying an angle of said fill yarns in each sail panels being weaved whereby said fill yarns are in a non-parallel relationship and are of an opposite slope leach to luff, in a cross-cut sail panel.

10. The method as defined in claim 7 wherein said weaving of said series of sail panels is by varying, in a leach area, fill yarn density in each of said sail panels being specific for said sail and wherein said fill yarn density is optionally varied from panel to panel during said weaving.

11. As an article of manufacture, a yarn-oriented structural sail of triangular shape comprised of a number of panels, wherein at least a majority of said panels are of a specifically woven material for each of said majority of panels; said majority of panels are across said sail from luff to leach; said majority of panels include fill yarns in said specifically woven material for each of said majority of panels and said fill yarns are non-parallel and are oriented in each of said panels along primary load path from panel to panel; wherein said fill yarns are primary structural members and are specific for each of said panels in said sail when said sail is in use for its intended purpose; and wherein warp yarns in said majority of panels comprise secondary structural members.

* * * * *